US012687840B2

(12) United States Patent
Gaduparthi et al.

(10) Patent No.: US 12,687,840 B2
(45) Date of Patent: Jul. 21, 2026

(54) METHOD AND SYSTEM FOR EXTRACTING AND COLLATING FAILURE KNOWLEDGE FROM DIVERSE SOURCES IN INDUSTRIAL PLANT

(71) Applicant: Tata Consultancy Services Limited, Mumbai (IN)

(72) Inventors: Trinath Gaduparthi, Pune (IN); Purnendu Kumar Rath, Kolkata (IN); Sapankumar Hiteshchandra Shah, Pune (IN); Sreedhar Sannareddy Reddy, Pune (IN); Purushottham Gautham Basavarsu, Pune (IN); Himanshu Nirgudkar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 541 days.

(21) Appl. No.: 18/198,108

(22) Filed: May 16, 2023

(65) Prior Publication Data
US 2023/0376013 A1 Nov. 23, 2023

(30) Foreign Application Priority Data
May 20, 2022 (IN) .............................. 202221029275

(51) Int. Cl.
G05B 19/418 (2006.01)
(52) U.S. Cl.
CPC ... G05B 19/4184 (2013.01); G05B 19/41865 (2013.01)
(58) Field of Classification Search
USPC ........................................................ 700/108
See application file for complete search history.

(56) References Cited

U.S. PATENT DOCUMENTS

| | | | |
|---|---|---|---|
| 2004/0024662 A1* | 2/2004 | Gray ...................... | G06Q 10/10 705/29 |
| 2009/0150325 A1* | 6/2009 | De .......................... | G06N 7/01 715/764 |

(Continued)

FOREIGN PATENT DOCUMENTS

| | | |
|---|---|---|
| CN | 111737496 A | 10/2020 |
| CN | 113723632 A | 11/2021 |

(Continued)

OTHER PUBLICATIONS

JP_2022034392_A (Year: 2022).*

(Continued)

*Primary Examiner* — Hien D Khuu
(74) *Attorney, Agent, or Firm* — FINNEGAN, HENDERSON, FARABOW, GARRETT & DUNNER LLP

(57) ABSTRACT

Failure analysis of industrial plants are stored in various types of documents associated with industrial plant. The documents are used by operators of plant to address any deviation that is active in plant. The operator generally has prior knowledge of relevant processes, equipment and sensors described in a deviation scenario in these documents. However, a system that is envisaged to aid operator in real-time does not have this information readily available as this knowledge is spread across documents. Currently available systems manually curate failure knowledge thereby making the process time consuming and prone to human errors. Present disclosure provides method and system for performing extracting and collating failure knowledge from diverse sources in industrial plant. The system automatically extracts failure knowledge present in text documents using trained models and links it with process, equipment, sensor (Continued)

relationships that are present in piping and instrumentation diagram to create failure scenario knowledge repository.

15 Claims, 6 Drawing Sheets

(56) References Cited

U.S. PATENT DOCUMENTS

| | | | |
|---|---|---|---|
| 2019/0102430 A1* | 4/2019 | Wang ........................ | G06N 7/01 |
| 2021/0273965 A1* | 9/2021 | Pi ............................ | G06N 20/00 |
| 2022/0067233 A1* | 3/2022 | Blackwell, II .......... | A63F 13/65 |

FOREIGN PATENT DOCUMENTS

| | | | | |
|---|---|---|---|---|
| EP | 3933653 A1 * | 1/2022 | ............. | G06F 30/27 |
| EP | 4682649 A1 * | 1/2026 | ............. | G06F 30/27 |
| WO | WO-2020014181 A1 * | 1/2020 | .............. | G06N 5/01 |
| WO | WO 2021/074905 A1 | 4/2021 | | |

OTHER PUBLICATIONS

Kim et al., "Deep-learning-based recognition of symbols and texts at an industrially applicable level from images of high-density piping and instrumentation diagrams," Expert Systems With Applications, 183 (2021).

* cited by examiner

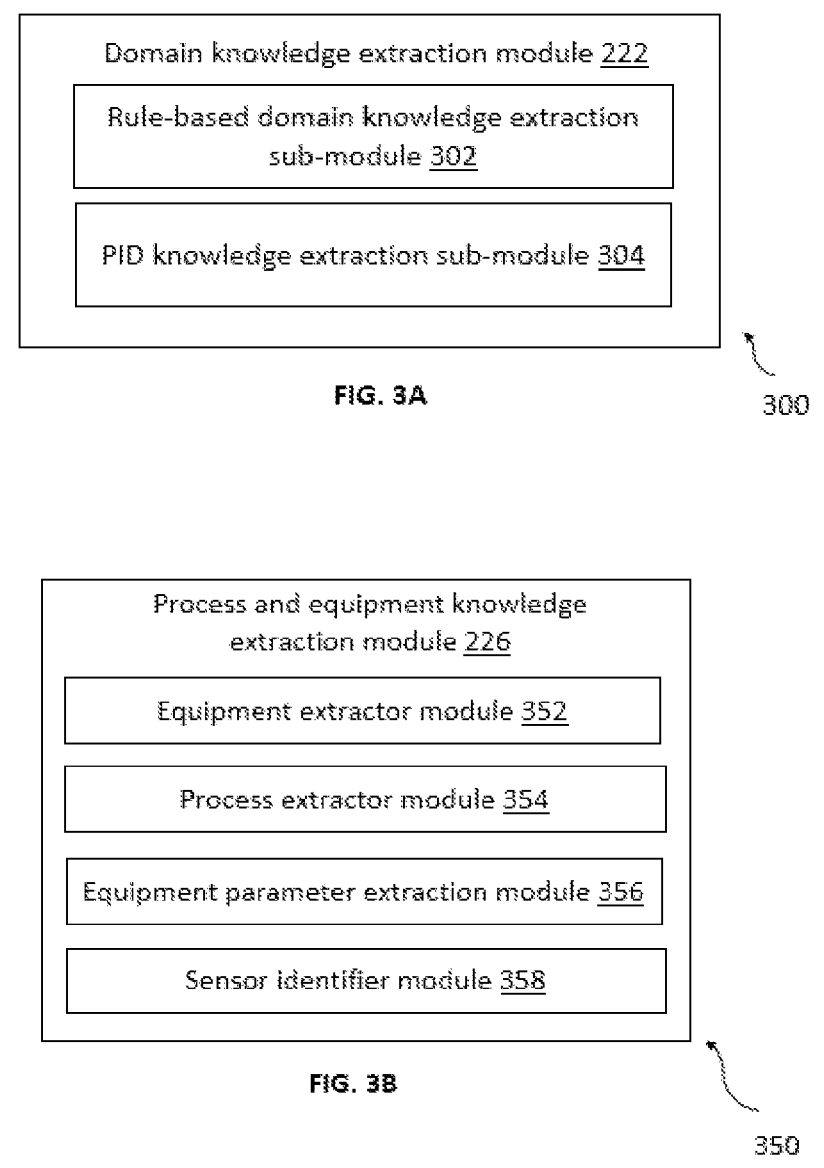

Domain knowledge extraction module 222

Rule-based domain knowledge extraction sub-module 302

PID knowledge extraction sub-module 304

Process and equipment knowledge extraction module 226

Equipment extractor module 352

Process extractor module 354

Equipment parameter extraction module 356

Sensor identifier module 358

FIG. 3B

350 receiving, by a failure knowledge collation and extraction system (FKCES) via one or more hardware processors, a plurality of documents associated with an industrial plant, the plurality of documents comprising one or more of: one or more failure knowledge collation and extraction system (FKCES) failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views                                                        502 pre-processing, by the FKCES via the one or more hardware processors, the plurality of documents to obtain a plurality of preprocessed documents 504 extracting, by the FKCES via the one or more hardware processors, plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, and wherein the process and equipment ontology comprises information about relationship that exist between one or more industrial processes, one or more equipment and one or more sensors that are present in the industrial plant                                                        506

A

FIG. 5A                                    500

extracting, by the FKCES via the one or more hardware processors, failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active     508 identifying, by the FKCES via the one or more hardware processors, at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario     510 determining, by the FKCES via the one or more hardware processors, at least one failure detection condition corresponding to each failure scenario based, at least in part, on the plant related information stored in the domain knowledge repository and the obtained process and equipment knowledge using a keyword dictionary     512 creating, by the FKCES via the one or more hardware processors, a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition     514

METHOD AND SYSTEM FOR EXTRACTING AND COLLATING FAILURE KNOWLEDGE FROM DIVERSE SOURCES IN INDUSTRIAL PLANT

PRIORITY CLAIM

This U.S. patent application claims priority under 35 U.S.C. § 119 to: India Application No. 202221029275, filed on May 20, 2022. The entire contents of the aforementioned application are incorporated herein by reference.

TECHNICAL FIELD

The disclosure herein generally relates to failure knowledge extraction, and, more particularly, to a method and a system for extracting and collating failure knowledge from diverse information sources in an industrial plant.

BACKGROUND

Occurrence of a failure in an industrial plant is very common but sometimes it can lead to some serious consequences, such as industrial accidents. So, performing failure analysis of the failure to understand the reason behind the occurrence of the failure becomes important. Generally, failure analysis methods, such as failure mode and effects analysis (FMEA), fault tree analysis (FTA), hazard and operability (HAZOP) analysis etc., are followed in process and manufacturing industries to catalog potential deviations in behavior of a system, their effects on connected systems and the recommended control actions that can mitigate the deviations and its effects. Basically, these analyses have become a common practice that are followed by almost all the industrial plants for improving the overall safety of the plant operations.

Further, the results of these analyses are stored in various types of documents in the reporting systems associated with the industrial plant. These documents are used by operators of the plant to address any potential or active deviations that has occurred or can occur in the plant. The operator generally has the prior knowledge of the relevant processes, equipment and sensors described in a possible deviation scenario in these documents. However, a system that is envisaged to aid the operator in real-time does not have this information readily available as this knowledge is spread across various documents such as FMEA sheets, FTA reports, HAZOP documents, original equipment manufacturer (OEM) manuals, and process and instrumentation diagrams (PIDs). Though, the operator does not have to search through PIDs to understand the process flow, the system may need plant topology information to give correct recommendations for a developing deviation.

Currently, systems that are available for helping the operators are manually driven i.e., they require manual transformation of the deviation-related knowledge that is residing in silos across reports, diagrams, and documents into a computer interpretable form so that it can be made actionable in real-time. Basically, they require manual curation of knowledge from diverse sources, such as text reports (HAZOP documents, FMEA documents, FTA reports, incident reports, OEM documents etc.), diagrams (P&ID diagrams, schematics, and scanned sheets) and experts. However, the manual curation of knowledge has its own set of disadvantages, such as higher amount of time consumption because of the large number of related documents, occurrence of human error in the curated knowledge etc. Further, reconciling knowledge that is spread across different types of document sources is cognitively demanding, and thus can lead to loss of important information in the curated knowledge.

In general, the available systems lack support for automated curation of failure knowledge from diverse information sources and an integrated solution that considers multiple input sources and extracts knowledge in a coherent manner is required.

SUMMARY

Embodiments of the present disclosure present technological improvements as solutions to one or more of the above-mentioned technical problems recognized by the inventors in conventional systems. For example, in one aspect, there is provided a processor implemented method for extracting and collating failure knowledge from diverse information sources in an industrial plant. The method comprises receiving, by a failure knowledge collation and extraction system (FKCES) via one or more hardware processors, a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views; pre-processing, by the FKCES via the one or more hardware processors, the plurality of documents to obtain a plurality of preprocessed documents; extracting, by the FKCES via the one or more hardware processors, plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, wherein the process and equipment ontology comprises information about relationship that exist between one or more industrial processes, one or more equipment and one or more sensors that are present in the industrial plant; extracting, by the FKCES via the one or more hardware processors, failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active; identifying, by the FKCES via the one or more hardware processors, at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario; determining, by the FKCES via the one or more hardware processors, at least one failure detection condition corresponding to each failure scenario based, at least in part, on the plant related information stored in the domain knowledge repository and the obtained process and equipment knowledge using a keyword dictionary; and creating, by the FKCES via the one or more hardware processors, a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

In another aspect, there is provided a failure knowledge collation and extraction system for extracting and collating failure knowledge from diverse information sources in an industrial plant. The system comprises a memory storing instructions; one or more communication interfaces; and one or more hardware processors coupled to the memory via the one or more communication interfaces, wherein the one or more hardware processors are configured by the instructions to: receive a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views; pre-processing the plurality of documents to obtain a plurality of preprocessed documents; extract plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, wherein the process and equipment ontology comprises information about relationship that exist between one or more industrial processes, one or more equipment and one or more sensors that are present in the industrial plant; extract failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active; identify at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario; determine at least one failure detection condition corresponding to each failure scenario based, at least in part, on the plant related information stored in the domain knowledge repository and the obtained process and equipment knowledge using a keyword dictionary; and create a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

In yet another aspect, there are provided one or more non-transitory machine-readable information storage mediums comprising one or more instructions which when executed by one or more hardware processors cause extraction and collation of failure knowledge from diverse information sources in an industrial plant by: receiving, by a failure knowledge collation and extraction system (FKCES), a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views; pre-processing, by the FKCES via the one or more hardware processors, the plurality of documents to obtain a plurality of preprocessed documents; extracting, by the FKCES, plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, wherein the process and equipment ontology comprises information about relationship that exist between one or more industrial processes, one or more equipment and one or more sensors that are present in the industrial plant; extracting, by the FKCES, failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active; identifying, by the FKCES, at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario; determining, by the FKCES, at least one failure detection condition corresponding to each failure scenario based, at least in part, on the plant related information stored in the domain knowledge repository and the obtained process and equipment knowledge using a keyword dictionary; and creating, by the FKCES, a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A illustrates a schematic block diagram representation of a domain knowledge extraction module associated with the system, in accordance with an embodiment of the present disclosure.

FIG. 3B illustrates a schematic block diagram representation of a process and equipment knowledge extraction module associated with the system, in accordance with an embodiment of the present disclosure.

FIGS. 5A and 5B, collectively, illustrate an exemplary flow diagram of a method for extracting and collating failure knowledge from diverse information sources in the industrial plant, in accordance with an embodiment of the present disclosure.

DETAILED DESCRIPTION

Figure 1:
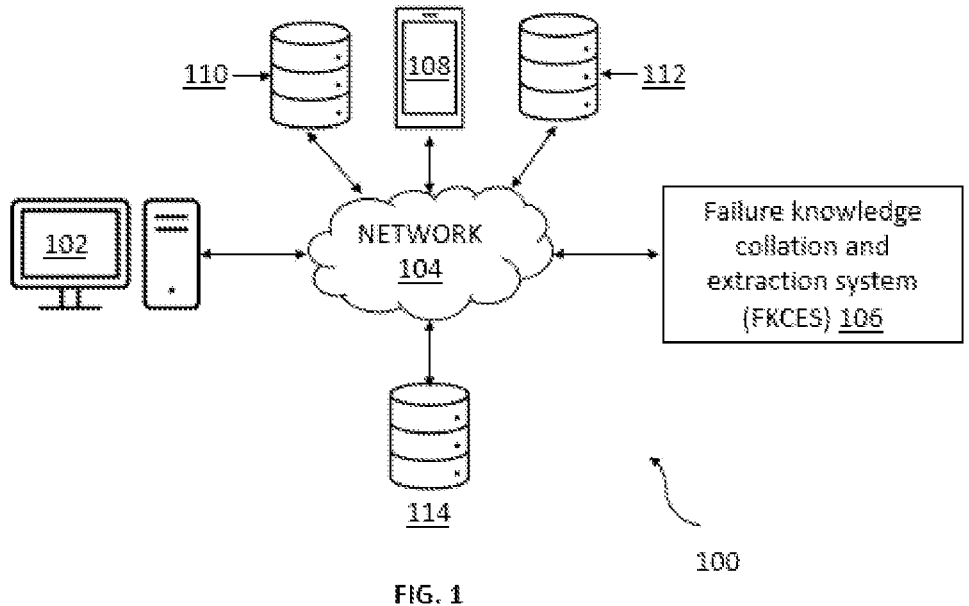
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In industrial plants, failure analysis methods are used to identify and analyze the reason behind the occurrence of a failure and to monitor potential deviations that have occurred in a plant system due to the occurrence of the failure. The analyzed information is generally stored in a plurality of documents, such as text documents, image documents and the like so that the stored information can be retrieved and used by an operator of the plant in case any deviation from the normal functioning is observed in the industrial plant. Though, the operators are generally aware of the relevant processes, equipment and sensors described in a possible deviation scenario in these documents, an automated system that can aid the operator in real-time by providing the relevant information in one go is still needed for tackling the deviation scenario.

Currently, available automated systems do not have the deviation related information readily available as this knowledge is spread across documents such as failure mode and effects analysis (FMEA) sheets, fault tree analysis (FTA) reports, hazard, and operability studies (HAZOP) documents, original equipment manufacturer (OEM) manuals and Piping and Instrumentation diagrams (PIDs). Further, these documents alone do not always provide complete information about a deviation or a failure scenario. The PIDs contain information about process, equipment, and associated sensors at a plant level, but they do not contain information about specific failure scenarios and the automated systems may require the plant topology information as well as the information about specific failure scenarios to give accurate recommendations for a developing deviation. So, to obtain complete information about the deviation or the failure scenario, the systems need to manually transform, with the help of experts, the deviation-related knowledge residing in silos across reports, diagrams, and documents into a computer interpretable form so that it can be made usable in real-time.

However, the manual transformation process has its own set of challenges due to the rich amount of information contained in these documents. Though the information contained in the documents is of immense use but the way the information is presented in these documents makes it difficult to leverage the information in automated systems as the information stays disjointed and is expressed in different forms and semi-formal ways. Further, reconciling knowledge spread across different types of document sources (text, images, etc.) is cognitively demanding and may lead to loss of important information in the curated knowledge. Additionally, it is noted that the industrial plants generally consist of hundreds of equipment and thus a high number of related documents are present for every plant, so chances of occurrence of inadvertent errors in the curated knowledge are high. Therefore, manual curation of failure knowledge is not feasible as it is very time-consuming and not desirable also due to the inadvertent errors/loss of information that may arise in the curated knowledge.

So, a technique that can consider all these input sources and extracts knowledge in a coherent manner, especially with a focus on failures of manufacturing systems/processes and related knowledge is still to be explored.

Embodiments of the present disclosure overcome the above-mentioned disadvantages by providing a method and a system for extracting and collating failure knowledge from diverse information sources in an industrial plant. The system of the present disclosure, instead of performing manual curation, automatically extracts failure knowledge present in text sources and links it with process knowledge (process, equipment, sensor relationships) present in PIDs using various methods and algorithms, such as naming schema, optical character recognition (OCR), named entity recognition (NER) methods, symbol detection, rule detection methods, column mapping, keyword matching, distance metrics, and the like. In particular, the system uses various documents available for a given industrial plant to extract domain knowledge related to entities of interest (such as equipment, process, sensors, failure modes etc.) and relationships among these entities (such as process-equipment-sensor mappings). The system then extracts failure knowledge associated with each failure scenario using one or more failure knowledge extraction models. The failure knowledge includes information about failure modes, causes, effects and control action(s) to be taken in case a failure scenario is active. Further, the system extracts relevant information on processes and equipment available at the plant level i.e., process and equipment knowledge associated with each failure scenario based on the extracted domain knowledge and the failure knowledge. The process and equipment knowledge includes information about industrial processes, equipment and sensors involved in each failure scenario. Thereafter, the system uses the process and equipment knowledge and the failure knowledge to build detection models that can determine a failure detection condition corresponding to each failure scenario. Finally, the system creates a failure scenario knowledge repository using the extracted failure knowledge, the obtained process and equipment knowledge, and the detection models. The created failure scenario knowledge repository may help a user/an operator of the industrial plant in handling a developing deviation by providing correct recommendations for the developing deviation.

In the present disclosure, the system and the method use information extracted from textual sources to aid extraction of entities and entity-entity relations from images, thereby reducing the amount of computation that needs to be performed by the system which further improves the processing speed of the system. Further, the system and the method automatically extract failure scenario knowledge from diverse sources of information present in the industrial plant, thereby reducing the time taken in performing failure knowledge curation while improving the accuracy of the curated failure knowledge.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, transforming domain specific language (DSL) statements into host programming language statements, replacing service call statements with function call statements, etc. The environment 100 generally includes one or more electronic devices, such as an electronic device 102 and a user device 108, and a failure knowledge collation and extraction system (hereinafter referred as FKCES) 106, each coupled to, and in communication with (and/or with access to) a network 104. It should be noted that two electronic devices are shown for the sake of explanation; there can be more number of electronic devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

The electronic device 102 is associated with an industrial plant for which a failure scenario knowledge repository is to be created using the FKCES 106. Similarly, the user device 108 is associated with a user (e.g., an operator of the industrial plant) who is responsible for operating and managing the industrial plant. In an embodiment, the electronic device 102 and the user device 108 can be a same electronic device. Examples of the electronic device 102 and the user device 108 include, but are not limited to, a personal computer (PC), a mobile phone, a tablet device, a Personal Digital Assistant (PDA), a server, a voice activated assistant, a smartphone, and a laptop.

The FKCES 106 includes one or more hardware processors and a memory. The FKCES 106 is configured to perform one or more of the operations described herein. The FKCES 106 is configured to receive a plurality of documents describing failure scenarios of an industrial plant via the network 104 from the electronic device 102. The documents can be in different formats, such as text documents, images, portable document format (PDF) documents, spreadsheets etc. In an embodiment, the plurality of documents includes, but are not limited to, failure mode and effects analysis (FMEA) documents, hazard and operability studies (HAZOP) documents, fault tree analysis (FTA) reports, incident reports, piping and instrumentation diagram (PID) sheets, and structured query language (SQL) views. The FKCES 106 is then configured to pre-process the plurality of documents to obtain a plurality of preprocessed documents. It should be noted that the pre-processing of the plurality of documents may be performed by the FKCES 106 using any pre-processing technique known in the art. The pre-processing technique may comprise, but not limited to, removal of noise, filtering unwanted information, enhancing image quality and resolution, text extraction and the like. In an embodiment, the FKCES 106 is configured to store the plurality of preprocessed documents in a document repository 110 maintained for the industrial plant.

Once the preprocessed documents are available, the FKCES 106 is configured to create a domain knowledge repository 112 by extracting plant related information from the plurality of preprocessed documents using one or more domain rules and an ontology extraction algorithm. The process of creating domain knowledge repository 112 is explained in detail with reference to FIG. 2. The domain knowledge repository includes information about one or more entities associated with one or more failure scenarios that are present in the plurality of preprocessed documents, one or more relationships that exist among the one or more entities present in the plurality of preprocessed documents, and a process and equipment ontology of the industrial plant.

Thereafter, the FKCES 106 extracts failure knowledge associated with each failure scenario of the one or more failure scenarios from the document repository 110 using one or more failure knowledge extraction models. The process of extracting failure knowledge is explained in detail with reference to FIGS. 5A-5B. The failure knowledge associated with each failure scenario includes one or more of at least one failure mode that led to a respective failure scenario, at least one cause associated with the respective failure scenario, at least one effect of the respective failure scenario on functioning of the industrial plant, and at least one control action to be taken when the respective failure scenario is active in the industrial plant.

Further, the FKCES 106 obtains process and equipment knowledge associated with each failure scenario by using at least one extraction model on the extracted failure knowledge and the plant related information. The process of obtaining the process and equipment knowledge is explained in detail with reference to FIG. 5A-5B. In an embodiment, the process and equipment knowledge includes information about at least one industrial process, at least one equipment and at least one sensor involved in each failure scenario.

Additionally, the FKCES 106 is configured to determine at least one failure detection condition corresponding to each failure scenario based on the plant related information and the obtained process and equipment knowledge using a keyword dictionary. In an embodiment, the keyword dictionary is maintained in a database associated with the FKCES 106. The process of determining the failure detection condition is explained in detail with reference to FIG. 2.

Once the failure knowledge associated with each failure scenario, the process and equipment knowledge associated with each failure scenario, and the failure detection condition corresponding to each failure scenario are available, the FKCES 106 utilizes this information as one of the inputs to create a failure scenario knowledge repository 114 that contains failure scenario knowledge associated with each failure scenario that can occur in the industrial plant. In an embodiment, the failure scenario knowledge includes the failure knowledge, the process and equipment knowledge and the at least one failure detection condition.

The user/operator of the industrial plant can now access the failure scenario knowledge repository 114 with the help of the FKCES 106 to obtain the failure scenario knowledge associated with a failure scenario in real-time in case the failure scenario is active or can occur in the industrial plant. In an embodiment, for obtaining the failure scenario knowledge associated with a failure scenario, the operator may have to share a failure scenario description associated with the failure scenario with the FKCES 106 using the user device 108 via the network 104. The FKCES 106, upon receiving the failure scenario description, access the failure scenario knowledge repository to obtain the failure scenario knowledge associated with the failure scenario. Once the failure scenario knowledge is available, the FKCES 106 displays the failure scenario knowledge associated with the failure scenario on the user device 108.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
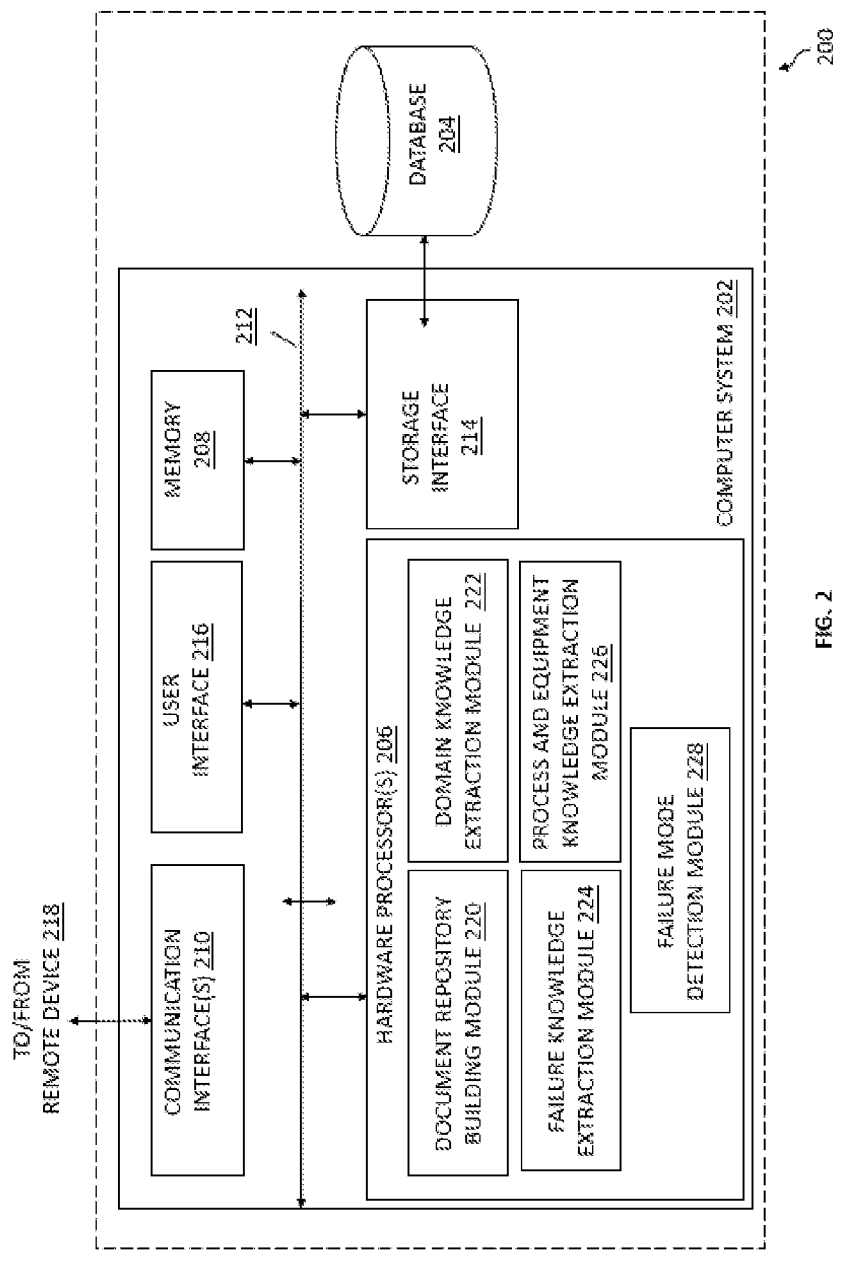
FIG. 2 illustrates an exemplary block diagram of a system for extracting and collating failure knowledge from diverse information sources in an industrial plant, in accordance with an embodiment of the present disclosure.

FIG. 2 illustrates an exemplary block diagram of a failure knowledge collation and extraction system (FKCES) 200 for extracting and collating failure knowledge from diverse information sources in an industrial plant, in accordance with an embodiment of the present disclosure. In an embodiment, the failure knowledge collation and extraction system (FKCES) 200 may also be referred as system 200 and may be interchangeably used herein. The system 200 is similar to the FKCES 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

The system 200 includes a computer system 202 and a system database 204. The computer system 202 includes one or more processors 206 for executing instructions, a memory 208, a communication interface 210, and a user interface 216 that communicate with each other via a bus 212.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the system database 204 can be stored in the memory 208, wherein the system database 204 may comprise, but are not limited to, keyword dictionary, domain rules, ontology extraction algorithm, keyword matching algorithm, failure knowledge extraction models, extraction models, and the like. The memory 208 further comprises (or may further comprise) information pertaining to input(s)/output(s) of each step performed by the systems and methods of the present disclosure. In other words, input(s) fed at each step and output(s) generated at each step are comprised in the memory 208 and can be utilized in further processing and analysis.

In some embodiments, the system database 204 is integrated within computer system 202. For example, the computer system 202 may include one or more hard disk drives as the system database 204. A storage interface 214 is any component capable of providing the one or more processors 206 with access to the system database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the one or more processors 206 with access to the system database 204. In one embodiment, the system database 204 is similar to the database explained with reference to FIG. 1.

The one or more processors 206 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 208.

The one or more processors 206 are operatively coupled to the communication interface 210 such that the one or more processors 206 communicate with a remote system 218 such as, the electronic device 102/the user device 108, or communicated with any entity (for e.g., the document repository 110, the domain knowledge repository 112 and the failure scenario knowledge repository 114) connected to the network 104. Further, the one or more processors 206 are operatively coupled to the user interface 216 for interacting with users, such as the user/operator of the industrial plant who is responsible for operating and handling the industrial plant.

It is noted that the system 200 as illustrated and hereinafter described is merely illustrative of a system that could benefit from embodiments of the present disclosure and, therefore, should not be taken to limit the scope of the present disclosure. It is noted that the system 200 may include fewer or more components than those depicted in FIG. 2.

In one embodiment, the one or more processors 206 includes a document repository building module 220, a domain knowledge extraction module 222, a failure knowledge extraction module 224, a process and equipment knowledge extraction module 226, and a failure mode detection module 228.

The document repository building module 220 includes suitable logic and/or interfaces for receiving the plurality of documents associated with an industrial plant from the electronic device 102. The plurality of documents includes one or more of one or more FMEA documents, one or more HAZOP documents, one or more FTA reports, one or more incident reports, one or more PID sheets, and one or more SQL views. In one embodiment, the document repository building module 220 is also configured to collect one or more documents from various sources such as web pages, external databases, and the like.

In at least one example embodiment, the document repository building module 220 is configured to perform pre-processing of the collected/received documents using one or more pre-processing techniques to obtain a plurality of preprocessed documents as some documents may require pre-processing to make them usable as per the system requirement. For instance, the text present in PIDs or metadata contained in HAZOP documents needs to be extracted for obtaining failure scenario knowledge associated with each failure scenario.

Once the pre-processing of the documents is done, the document repository building module 220 is configured to store the plurality of documents in the document repository 110 along with metadata associated with each document of the plurality of documents. In an embodiment, the metadata includes information, such as type of the document, source of the document, name of the process(es) contained in the document, equipment involved, etc.

The domain knowledge extraction module 222 includes suitable logic and/or interfaces for accessing one or more text documents, such as FMEA documents, HAZOP documents, incident reports etc., and PID sheets from the plurality of pre-processed documents that are stored in the document repository 110. Once the required documents are available, the domain knowledge extraction module 222 is configured to extract plant related information from the documents using one or more domain rules and an ontology extraction algorithm. The domain knowledge extraction module 222 is also configured to store the extracted plant related information in the domain knowledge repository 112. In one embodiment, the plant related information includes information about one or more entities associated with one or more failure scenarios that are present in the text documents, one or more relationships that exist among the one or more entities present in the text documents, and a process and equipment ontology of the industrial plant.

In at least one example embodiment, the domain knowledge extraction module 222 is configured to extract information about one or more entities associated with the one or more failure scenarios that are present in the FMEA documents, the HAZOP documents, the FTA reports, the incident reports, and the SQL reports using naming schema.

In an embodiment, the domain knowledge extraction module 222 includes a rule-based domain knowledge extraction sub-module 302 and a PID knowledge extraction sub-module 304 (shown with reference to FIG. 3A). The rule-based domain knowledge extraction sub-module 302 is configured to extract one or more relationships that exist among the one or more entities present in the text documents using the one or more domain rules. In one embodiment, the domain rules are nothing but patterns that help in inferring relationships among the one or more entities present in the text documents. For example, general regular expressions like two capital letters followed by few numbers can be used as a domain rule for extracting one or more equipment patterns present in the text documents. Similarly, other domain rules can be created with the help of domain experts for extracting one or more sensor patterns present in the text documents. The rule-based domain knowledge extraction sub-module 302 is also configured to store the information about the relationships that exist among the one or more entities in the domain knowledge repository 112.

The PID knowledge extraction sub-module 304 is in communication with the rule-based domain knowledge extraction sub-module 302. The PID knowledge extraction sub-module 304 is configured to extract the process and equipment ontology of the industrial plant from the PID sheets based on the one or more equipment patterns and the one or more sensor patterns using the ontology extraction algorithm (explained in detail with reference to FIG. 5). In an embodiment, the process and equipment ontology includes information about relationship that exist between one or more industrial processes, one or more equipment and one or more sensors that are present in the industrial plant.

In one embodiment, the PID knowledge extraction sub-module 304 extracts industrial process name from each PID sheet by first looking at a few possible locations, such as four corners, top-center, and bottom-center of each PID sheet and then performing OCR at the possible locations. Further, the PID knowledge extraction sub-module 304 assign sensors to specific equipment using distance metric and domain rules. In an example scenario, the PID knowledge extraction sub-module 304 may first extract coordinates of equipment and sensors present in each PID sheet and then use a distance metric, such as a Euclidean distance, a Manhattan distance etc., to assign sensors to nearby equipment present in the PID sheet. Thereafter, the PID knowledge extraction sub-module 304 may use proximity analysis along with domain rules such as considering sensors close to specific process flow lines in the PID to extract relationships among the industrial processes, the equipment and the sensors that are present in the industrial plant. In an embodiment, the extracted relationships include equipment-sensor relations and equipment-process relations.

The failure knowledge extraction module 224 includes suitable logic and/or interfaces for accessing the plurality of pre-processed documents stored in the document repository 110 and for accessing information stored in the domain knowledge repository 112. The failure knowledge extraction module 224 is configured to extract failure knowledge associated with each failure scenario of the one or more failure scenarios from the document repository 110 using one or more failure knowledge extraction models. In one embodiment, the one or more failure knowledge extraction model includes rule-based models and supervised machine learning based models. In an embodiment, the failure knowledge associated with each failure scenario includes one or more of at least one failure mode that led to a respective failure scenario, at least one cause associated with the respective failure scenario, at least one effect of the respective failure scenario on functioning of the industrial plant, and at least one control action that is to be taken when the respective failure scenario is active.

In at least one example embodiment, the rule-based models may perform column mapping in a plurality of headers of spreadsheet columns present in each HAZOP document of the one or more HAZOP documents to extract the at least one failure mode, the at least one cause, the at least one effect and the at least one control action associated with each failure scenario. The supervised machine learning based models may use manually labelled data to extract failure knowledge from documents, such as incident reports. More specifically, a two-step process is followed by the supervised machine learning based models for extracting the failure knowledge from documents. In first step, instances of various equipment, their parameters, parameter values, etc. are extracted from text fragments present in the documents. Then, the extracted plant related information along with textual features of given text fragment is used as input to learn/classify the text fragment into failure mode, cause, effect, and control action.

The process and equipment knowledge extraction module 226 includes suitable logic and/or interfaces for accessing the plurality of pre-processed documents stored in the document repository 110 and for accessing information stored in the domain knowledge repository 112. The process and equipment knowledge extraction module 226 is in communication with the failure knowledge extraction module 224. The process and equipment knowledge extraction module 226 is configured to identify at least one industrial process, at least one equipment and at least one sensor involved in each failure scenario based, at least in part, on the failure knowledge associated with the respective failure scenario and the plant related information stored in the domain knowledge repository 112 using at least one extraction model to obtain process and equipment knowledge associated with each failure scenario.

In an embodiment, the process and equipment knowledge extraction module 226 includes an equipment extractor module 352, a process extractor module 354, an equipment parameter extraction module 356, and a sensor identifier module 358 (shown with reference to FIG. 3B).

The equipment extractor module 352 is configured to extract one or more equipment instances from the failure knowledge associated with each failure scenario using the at least one extraction model to obtain the at least one equipment associated with each failure scenario. The at least one extraction model is one of a rule-based model, and a supervised learning model. In one embodiment, the rule-based model may use rules such as naming schemas to extract the one or more equipment instances. The supervised learning model identify the one or more equipment instances using labelled dataset.

The process extractor module 354 is in communication with the equipment extractor module 352. The process extractor module 354 is configured to extract a plurality of industrial processes relevant to each failure scenario based, at least in part, on the plant related information stored in the domain knowledge repository 112 and the extracted one or more equipment instances. Once the plurality of industrial processes is extracted, the process extractor module 354 is configured to rank the plurality of industrial processes relevant to each failure scenario based on failure scenario description of the corresponding failure scenario to determine the at least one industrial process associated with each failure scenario.

The equipment parameter extraction module 356 is configured to identify at least one equipment parameter involved in each failure scenario based on the failure scenario description of the corresponding failure scenario using a predefined parameter keyword dictionary. For example, assume the failure scenario description include the text such as 'increase in pressure of' and when the parameter keyword dictionary is used on the failure scenario description, the equipment parameter extraction module 356 may identify the equipment parameter that is under consideration is 'pressure' as pressure may be defined as a parameter in the predefined parameter keyword dictionary.

The sensor identifier module 358 is in communication with the equipment parameter extraction module 356. The sensor identifier module 358 is configured to identify the at least one sensor that measures the at least one equipment parameter involved in each failure scenario using the plant related information stored in the domain knowledge repository 112. In particular, the sensor that is responsible for measuring equipment parameter identified by the equipment parameter extraction module 356 is considered as the sensor involved in the failure scenario. So, with reference to the previous example, the sensor, which is responsible for measuring pressure will be considered, as 'pressure' is the identified equipment parameter.

The failure mode detection module 228 is configured to determine at least one failure detection condition corresponding to each failure scenario based, at least in part, on the plant related information stored in the domain knowledge repository 112 and the obtained process and equipment knowledge using a keyword dictionary. In particular, the failure mode detection module 228 determines the detection conditions of a failure scenario using keywords present in the failure scenario description, the plant related information and the process and equipment knowledge. For example, the failure mode detection module 228 may use the keyword dictionary to first identify keywords present in a failure scenario description. The failure scenario description may contain keywords such as 'loss of', 'increase', and 'decrease' which may indicate detection conditions such as reduction in flowrate, increase in temperature and decrease in level, respectively. This information along with the plant related information and the process and equipment knowledge are used by the failure mode detection module 228 to arrive at a detection condition for the failure scenario. It should be noted that the detection condition is made up of a combination of sensor parameters and their limits. The limits of a sensor parameter can be obtained either from expert inputs or by applying learning techniques on a time series of historic or real-time data.

Once the document repository 110 and the domain knowledge repository 112 are created and the failure knowledge associated with each failure scenario, the process and equipment knowledge associated with each failure scenario, and the at least one failure detection condition corresponding to each failure scenario are available, the one or more processors 206 are configured to create the failure scenario knowledge repository 114 using the failure knowledge associated with each failure scenario, the process and equipment knowledge associated with each failure scenario, and the at least one failure detection condition corresponding to each failure scenario. In an embodiment, the failure scenario knowledge repository includes failure scenario knowledge associated with each failure scenario that can occur in the industrial plant. In one embodiment, the failure scenario knowledge associated with each failure scenario includes the failure knowledge, the process and equipment knowledge and the at least one failure detection condition.

Figure 4:
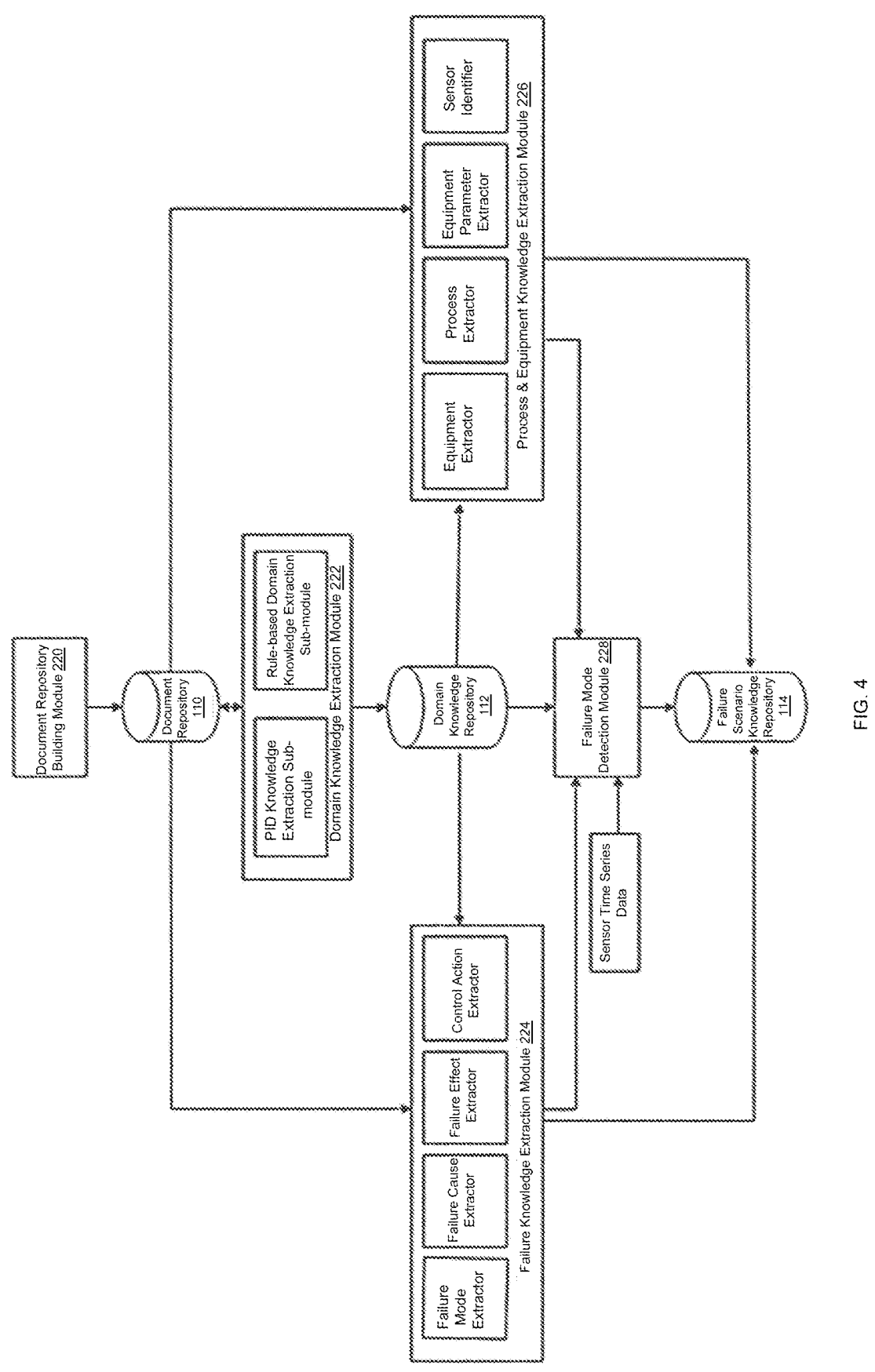
FIG. 4 illustrates a schematic block diagram representation of a failure knowledge collation and extraction process associated with the system for extracting and collating failure knowledge from diverse information sources in the industrial plant, in accordance with an embodiment of the present disclosure.

FIG. 4, with reference to FIGS. 1-3B, illustrates a schematic block diagram representation 400 of a failure knowledge collation and extraction process associated with the system 200 of FIG. 2 or the FKCES 106 of FIG. 1 for extracting and collating failure knowledge from diverse information sources in the industrial plant, in accordance with an embodiment of the present disclosure.

FIGS. 5A and 5B, with reference to FIGS. 1, 2 and 3A-3B, collectively, illustrate an exemplary flow diagram 500 of a method for extracting and collating failure knowledge from diverse information sources in the industrial plant, in accordance with an embodiment of the present disclosure. The method 500 may use the system 200 of FIG. 2 and FKCES 106 of FIG. 1 for execution. In an embodiment, the system 200 comprises one or more data storage devices or the memory 208 operatively coupled to the one or more hardware processors 206 and is configured to store instructions for execution of steps of the method 500 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the FKCES 106 of FIG. 1.

In an embodiment of the present disclosure, at step 502, the one or more hardware processors 206 of the system 200 receive a plurality of documents associated with an industrial plant. The plurality of documents includes one or more of one or more FMEA documents, one or more HAZOP documents, one or more FTA reports, one or more incident reports, one or more PID sheets, and one or more SQL views.

At step 504 of the present disclosure, the one or more hardware processors 206 of the system 200 pre-process the plurality of documents to obtain a plurality of preprocessed documents. As few documents may need pre-processing to make them usable for failure knowledge extraction, the hardware processors 206 pre-process them and store the plurality of preprocessed documents in the document repository 110.

At step 506 of the present disclosure, the one or more hardware processors 204 of the system 200 extract plant related information from the plurality of preprocessed documents stored in the document repository 110 using one or more domain rules and an ontology extraction algorithm to create a domain knowledge repository. The domain knowledge repository includes information about one or more entities associated with one or more failure scenarios that are present in the plurality of preprocessed documents, one or more relationships that exist among the one or more entities present in the plurality of preprocessed documents, and a process and equipment ontology of the industrial plant. The above step 506 is better understood by way of following description.

Once the preprocessed documents are available, the system 200 extracts the one or more entities, such as equipment and sensors associated with the one or more failure scenarios that are present in the one or more FMEA documents, the one or more HAZOP documents, the one or more FTA reports, the one or more incident reports and the one or more SQL reports using naming schema of equipment and sensors. Thereafter, the system 200 extracts the one or more relationships that exist among the one or more entities present in the one or more HAZOP documents, the one or more incident reports and the one or more FMEA documents using the one or more domain rules. In particular, general regular expressions are used as part of domain rules to extract one or more equipment patterns and one or more sensor patterns. Further, the system 200 extracts the process and equipment ontology of the industrial plant from the one or more PID sheets based on the one or more equipment patterns and the one or more sensor patterns using the ontology extraction algorithm.

In an embodiment, the system 200, as part of using the ontology extraction algorithm, first converts each PID sheet of the one or more PID sheets into a black and white image. Then, at least one text bounding box present in each PID sheet is obtained using an optical character recognition (OCR) tool. The system 200 then aligns each text bounding box of the at least one text bounding box present in each PID sheet either horizontally or vertically based on text coordinates present in the corresponding text bounding box. Thereafter, the system 200 uses the one or more equipment patterns and the one or more sensor patterns to merge each text bounding box based on text present in corresponding text bounding box to extract one or more equipment, one or more sensors and coordinates associated with each equipment and sensor that are present in each PID sheet.

Once the information about the one or more sensors, the one or more equipment, and the coordinates of each equipment that are present in each PID sheet is available, the system 200, for each sensor of the one or more sensors present in each PID sheet, determines at least one associated equipment from the one or more equipment by applying a proximity threshold to a distance metric in accordance with a process flow line structure to obtain an equipment-sensor relationship. In an embodiment, the process flow line structure includes information associated with each process flow line of one or more process flow lines that are present in a PID sheet. The distance metric is one of a Euclidean distance and a Manhattan distance.

Thereafter, the system 200 extracts a process name for each PID sheet of the one or more PID sheets based on one or more predefined coordinates using the OCR tool to obtain a process-equipment relationship. As discussed earlier, the system 200 looks at some possible locations, such as four corners, top-center, and bottom-center of each PID sheet to obtain the industrial process name associated with each PID sheet. The industrial process name and the information about the one or more equipment present in each PID sheet is used by the system to come up with process-equipment relationship.

Further, the system 200 creates the process and equipment ontology of the industrial plant based, at least in part, on the obtained equipment-sensor relationship and the process-equipment relationship. In an embodiment, the process and equipment ontology includes information about relationship that exist between the one or more industrial processes, the one or more equipment and the one or more sensors that are present in the industrial plant.

At step 508 of the present disclosure, the one or more hardware processors 204 of the system 200 extract failure knowledge associated with each failure scenario of the one or more failure scenarios from the document repository 110 using one or more failure knowledge extraction models. The failure knowledge associated with each failure scenario includes one or more of at least one failure mode that led to a respective failure scenario, at least one cause associated with the respective failure scenario, at least one effect of the respective failure scenario on functioning of the industrial plant, and at least one control action to be taken when the respective failure scenario is active. The above step 508 is better understood by way of following description.

The system 200 first extracts the failure knowledge associated with each failure scenario that is present in the structured documents, such as HAZOP documents. So, the system 200 performs column mapping in a plurality of headers of spreadsheet columns present in each HAZOP document of the one or more HAZOP documents to extract the at least one failure mode, the at least one cause, the at least one effect and the at least one control action associated with each failure scenario present in the structured documents.

Thereafter, the system 200 extracts the failure knowledge associated with each failure scenario that is present in the unstructured documents, like incident reports. So, to obtain the failure knowledge, the system 200 first uses the process and equipment ontology to extract the information about the one or more industrial processes, the one or more equipment and the one or more sensors present in each paragraph of each incident report. Thereafter, the system 200 extracts the at least one equipment parameter associated with each equipment of the one or more equipment using a keyword matching algorithm. It should be noted that the keyword matching algorithm can be any keyword matching algorithm known in the art, such as cosine similarity algorithm on word embeddings, Wu-Palmer similarity algorithm. The process of extracting equipment parameter is explained in detail with reference to FIG. 2 and the process is not reiterated herein for the sake of brevity.

Further, the system 200 extracts at least one term frequency-inverse document frequency (tf-idf) vector for each paragraph of each incident report based on text content present in the corresponding paragraph of the corresponding incident report. Once the tf-idf vector for each paragraph is available, the system 200 performs concatenation of the information about the one or more industrial processes, the one or more equipment and the one or more sensors, the at least one equipment parameter associated with each equipment of the one or more equipment, and the at least one tf-idf vector created for each paragraph of each incident report to obtain an input feature vector for performing classification of the corresponding paragraph. The obtained input feature vector is then provided as input to the one or more failure knowledge extraction models that are present for determining the at least one failure mode, the at least one cause, the at least one effect and the at least one control action associated with each failure scenario present in the one or more incident reports. In an embodiment, the one or more failure knowledge extraction models are trained supervised machine learning models.

In an embodiment, at step 510 of the present disclosure, the one or more hardware processors 204 of the system 200 identify at least one industrial process, at least one equipment and at least one sensor involved in each failure scenario based, at least in part, on the failure knowledge associated with the respective failure scenario and the plant related information stored in the domain knowledge repository 112 using at least one extraction model to obtain process and equipment knowledge associated with each failure scenario. The process of identifying the at least one industrial process, the at least one equipment and the at least one sensor involved in each failure scenario is explained in detail with reference to FIG. 2 and the process is not reiterated herein for the sake of brevity.

At step 512 of the present disclosure, the one or more hardware processors 204 of the system 200 determine at least one failure detection condition corresponding to each failure scenario based, at least in part, on the plant related information stored in the domain knowledge repository 112 and the obtained process and equipment knowledge using a keyword dictionary. Basically, the change in parameters that can provide indication of the failure scenario is identified at this step. The process of determining the at least one failure detection condition corresponding to each failure scenario is explained in detail with reference to FIG. 2 and the process is not reiterated herein for the sake of brevity.

At step 514 of the present disclosure, the one or more hardware processors 204 of the system 200 create a failure scenario knowledge repository using the extracted failure knowledge associated with each failure scenario, the obtained process and equipment knowledge associated with each failure scenario, and the determined at least one failure detection condition corresponding to each failure scenario. The 37ailuree scenario knowledge repository includes failure scenario knowledge associated with each failure scenario that can occur in the industrial plant. The failure scenario knowledge includes the failure knowledge, the process and equipment knowledge and the at least one failure detection condition.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, conventional systems that are available for helping operator require manual transformation of the deviation-related knowledge that resides in silos across reports, diagrams, and documents associated with the industrial plant. In general, the failure knowledge needs to be manually curated from diverse sources such as HAZOP documents, FMEA documents, Fault Tree Diagrams, incident reports, OEM documents, and PID diagrams and the manual curation is very time consuming- and exhausting as the information contained in documents stays disjointed and is usually expressed in different forms. So, to overcome the disadvantages, embodiments of the present disclosure provide a method and a system for extracting and collating failure knowledge from diverse information sources in an industrial plant. More specifically, the system automatically extracts failure scenario knowledge from diverse sources of information present in the industrial plant, thereby reducing the time taken in performing failure knowledge curation while improving the accuracy of the curated failure knowledge. Further, the system and the method use information extracted from textual sources to aid extraction of entities and entity-entity relations from images, thereby reducing the amount of computation that needs to be performed by the system which further improves the processing speed of the system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a failure knowledge collation and extraction system (FKCES) via one or more hardware processors, a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views;

pre-processing, by the FKCES via the one or more hardware processors, the plurality of documents to obtain a plurality of preprocessed documents;

extracting, by the FKCES via the one or more hardware processors, plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, and wherein the process and equipment ontology comprises information about relationship that exist between one or more industrial processes, one or more equipment and one or more sensors that are present in the industrial plant, wherein the ontology extraction algorithm comprises:

converting each PID sheet of the one or more PID sheets into a black and white image;

obtaining at least one text bounding box present in each PID sheet using an optical character recognition (OCR) tool, aligning each text bounding box of the at least one text bounding box present in each PID sheet either horizontally or vertically based on text coordinates present in the corresponding text bounding box;

merging each text bounding box based on text present in corresponding text bounding box using the one or more equipment patterns and the one or more sensor patterns to extract one or more equipment, one or more sensors and coordinates associated with each equipment and sensor that are present in each PID sheet;

for each sensor of the one or more sensors, determining at least one associated equipment from the one or more equipment by applying a proximity threshold to a distance metric in accordance with a process flow line structure to obtain an equipment-sensor relationship, wherein the process flow line structure comprises information associated each process flow line of one or more process flow lines that are present in a PID sheet, and wherein the distance metric is one of a: Euclidean distance and Manhattan distance;

extracting a process name for each PID sheet of the one or more PID sheets based on one or more predefined coordinates using the OCR tool to obtain a process-equipment relationship; and creating the process and equipment ontology of the industrial plant based, at least in part, on the obtained equipment-sensor relationship and the process-equipment relationship;

extracting, by the FKCES via the one or more hardware processors, failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active;

identifying, by the FKCES via the one or more hardware processors, at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario;

determining, by the FKCES via the one or more hardware processors, at least one failure detection condition corresponding to each failure scenario based, at least in part, on the plant related information stored in the domain knowledge repository and the obtained process and equipment knowledge using a keyword dictionary; and creating, by the FKCES via the one or more hardware processors, a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

2. The processor implemented method of claim 1, further comprising:

receiving, by the FKCES via the one or more hardware processors, a failure scenario description associated with a failure scenario from a user device;

using, by the FKCES via the one or more hardware processors, the failure scenario knowledge repository to obtain failure scenario knowledge associated with the failure scenario; and displaying, by the FKCES via the one or more hardware processors, the failure scenario knowledge associated with the failure scenario on the user device, wherein user device is associated with at least one user responsible for operating and managing the industrial plant.

3. The processor implemented method of claim 1, wherein the step extracting, by the FKCES via the one or more hardware processors, the industrial plant related information from the plurality of preprocessed documents present in the document repository using the one or more domain rules and the ontology extraction algorithm to create the domain knowledge repository comprises:

extracting, by the FKCES via the one or more hardware processors, the one or more entities associated with the one or more failure scenarios that are present in the one or more FMEA documents, the one or more HAZOP documents, the one or more FTA reports, the one or more incident reports, one or more original equipment manufacturer (OEM) manuals, one or more piping and instrumentation diagrams (PIDs), and the one or more SQL reports using naming schema;

extracting, by the FKCES via the one or more hardware processors, the one or more relationships that exist among the one or more entities present in the one or more HAZOP documents, the one or more incident reports and the one or more FMEA documents using the one or more domain rules, wherein the one or more relationships comprise one or more of: one or more equipment patterns and one or more sensor patterns; and extracting, by the FKCES via the one or more hardware processors, the process and equipment ontology of the industrial plant from the one or more PID sheets based on the one or more equipment patterns and the one or more sensor patterns using the ontology extraction algorithm.

4. The processor implemented method of claim 1, wherein the step of extracting, by the FKCES via the one or more hardware processors, the failure knowledge associated with each failure scenario of the one or more failure scenarios from the domain knowledge repository using the one or more failure knowledge extraction models comprises:

extracting, by the FKCES via the one or more hardware processors, the at least one failure mode that led to respective failure scenario, the at least one cause associated with the respective failure scenario, the at least one effect respective failure scenario on functioning of the industrial plant and the at least one control action to be taken when the respective failure scenario is active in the industrial plant associated with each failure scenario by performing column mapping in a plurality of headers of spreadsheet columns present in each HAZOP document of the one or more HAZOP documents to extract the at least one failure mode, the at least one cause, the at least one effect and the at least one control action associated with each failure scenario;

extracting, by the FKCES via the one or more hardware processors, information about the one or more industrial processes, the one or more equipment and the one or more sensors present in each paragraph of each incident report using the process and equipment ontology;

extracting, by the FKCES via the one or more hardware processors, at least one equipment parameter associated with each equipment using a keyword matching algorithm;

creating, by the FKCES via the one or more hardware processors, at least one term frequency-inverse document frequency (tf-idf) vector for each paragraph of each incident report based on text content present in the corresponding paragraph of the corresponding incident report;

performing, by the FKCES via the one or more hardware processors, concatenation of the information about the one or more industrial processes, the one or more equipment and the one or more sensors, the at least one equipment parameter associated with each equipment of the one or more equipment, and the at least one tf-idf vector created for each paragraph of each incident report to obtain an input feature vector for performing classification of the corresponding paragraph; and providing, by the FKCES via the one or more hardware processors, the input feature vector as an input to the one or more failure knowledge extraction models, wherein the one or more failure knowledge extraction models determine the at least one failure mode, the at least one cause, the at least one effect and the at least one control action associated with each failure scenario from the one or more incident reports, and wherein the one or more failure knowledge extraction models are trained models.

5. The processor implemented method of claim 1, wherein the step of identifying, by the FKCES via the one or more hardware processors, the at least one industrial process, the at least one equipment and the at least one sensor involved in each failure scenario based, at least in part, on the failure knowledge associated with the respective failure scenario and the plant related information stored in the domain knowledge repository using the at least one extraction model to obtain the process and equipment knowledge associated with each failure scenario comprises:

extracting, by the FKCES via the one or more hardware processors, one or more equipment instances from the failure knowledge associated with each failure scenario using the at least one extraction model to obtain the at least one equipment associated with each failure scenario, wherein the at least one extraction model is one of: a rule- based model, and a supervised learning model;

identifying, by the FKCES via the one or more hardware processors, a plurality of industrial processes relevant to each failure scenario based, at least in part, on the plant related information stored in the domain knowledge repository and the extracted one or more equipment instances;

ranking, by the FKCES via the one or more hardware processors, the plurality of industrial processes relevant to each failure scenario based on failure scenario description of the corresponding failure scenario to determine the at least one industrial process associated with each failure scenario;

obtaining, by the FKCES via the one or more hardware processors, at least one equipment parameter involved in each failure scenario based on the failure scenario description of the corresponding failure scenario using a predefined parameter keyword dictionary; and identifying, by the FKCES via the one or more hardware processors, the at least one sensor that measures the at least one equipment parameter involved in each failure scenario using the plant related information stored in the domain knowledge repository.

6. A failure knowledge collation and extraction system (FKCES), comprising:

one or more memories, and one or more hardware processors, the one or more memories coupled to the one or more hardware processors; wherein the one or more hardware processors are configured to execute programmed instructions stored in the one or more memories to:

receive a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views;

pre-process the plurality of documents to obtain a plurality of preprocessed documents;

extract plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, and wherein the process and equipment ontology comprises information about relationship that exist between one or more industrial processes, one or more equipment and one or more sensors that are present in the industrial plant, wherein the ontology extraction algorithm comprises:

converting each PID sheet of the one or more PID sheets into a black and white image;

obtaining at least one text bounding box present in each PID sheet using an optical character recognition (OCR) tool, aligning each text bounding box of the at least one text bounding box present in each PID sheet either horizontally or vertically based on text coordinates present in the corresponding text bounding box;

merging each text bounding box based on text present in corresponding text bounding box using the one or more equipment patterns and the one or more sensor patterns to extract one or more equipment, one or more sensors and coordinates associated with each equipment and sensor that are present in each PID sheet;

for each sensor of the one or more sensors, determining at least one associated equipment from the one or more equipment by applying a proximity threshold to a distance metric in accordance with a process flow line structure to obtain an equipment-sensor relationship, wherein the process flow line structure comprises information associated each process flow line of one or more process flow lines that are present in a PID sheet, and wherein the distance metric is one of a: Euclidean distance and Manhattan distance;

extracting a process name for each PID sheet of the one or more PID sheets based on one or more predefined coordinates using the OCR tool to obtain a process-equipment relationship; and creating the process and equipment ontology of the industrial plant based, at least in part, on the obtained equipment-sensor relationship and the process-equipment relationship;

extract failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active;

identify at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario;

determine at least one failure detection condition corresponding to each failure scenario based, at least in part, on the plant related information stored in the domain knowledge repository and the obtained process and equipment knowledge using a keyword dictionary; and create a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

7. The system of claim 6, wherein the one or more hardware processors are configured by the instructions to:

receive a failure scenario description associated with a failure scenario from a user device;

use the failure scenario knowledge repository to obtain failure scenario knowledge associated with the failure scenario; and display the failure scenario knowledge associated with the failure scenario on the user device.

8. The system of claim 6, wherein for extracting the plant related information from the plurality of preprocessed documents present in the document repository using the one or more domain rules and the ontology extraction algorithm to create the domain knowledge repository, the one or more hardware processors are configured by the instructions to:

extract the one or more entities associated with the one or more failure scenarios that are present in the one or more FMEA documents, the one or more HAZOP documents, the one or more FTA reports, the one or more incident reports and the one or more SQL reports using naming schema;

extract the one or more relationships that exist among the one or more entities present in the one or more HAZOP documents, the one or more incident reports and the one or more FMEA documents using the one or more domain rules, wherein the one or more relationships comprise one or more of: one or more equipment patterns and one or more sensor patterns; and extract the process and equipment ontology of the industrial plant from the one or more PID sheets based on the one or more equipment patterns and one or more sensor patterns using the ontology extraction algorithm, wherein extracting the one or more sensor patterns present in the text documents that are present in the industrial plant, wherein PID knowledge extraction assign sensors to specific equipment using a distance metric and domain rules and uses proximity analysis along with the domain rules such as considering sensors close to specific process flow lines in the PID to extract relationships among the industrial processes, the equipment and the sensors that are present in the industrial plant.

9. The system of claim 6, wherein for extracting the failure knowledge associated with each failure scenario of the one or more failure scenarios from the domain knowledge repository using the one or more failure knowledge extraction models, the one or more hardware processors are configured by the instructions to:

extract the at least one failure mode, the at least one cause, the at least one effect and the at least one control action associated with each failure scenario by performing column mapping in a plurality of headers of spreadsheet columns present in each HAZOP document of the one or more HAZOP documents;

extract information about the one or more industrial processes, the one or more equipment and the one or more sensors present in each paragraph of each incident report using the process and equipment ontology;

extract at least one equipment parameter associated with each equipment using a keyword matching algorithm;

create at least one term frequency-inverse document frequency (tf-idf) vector for each paragraph of each incident report based on text content present in the corresponding paragraph of the corresponding incident report;

perform concatenation of the information about the one or more industrial processes, the one or more equipment and the one or more sensors, the at least one equipment parameter associated with each equipment of the one or more equipment, and the at least one tf-idf vector created for each paragraph of each incident report to obtain an input feature vector for performing classification of the corresponding paragraph; and provide the input feature vector as an input to the one or more failure knowledge extraction models, wherein the one or more failure knowledge extraction models determine the at least one failure mode, the at least one cause, the at least one effect and the at least one control action associated with each failure scenario from the one or more incident reports, and wherein the one or more failure knowledge extraction models are trained models.

10. The system of claim 6, wherein for identifying the at least one industrial process, the at least one equipment and the at least one sensor involved in each failure scenario based, at least in part, on the failure knowledge associated with the respective failure scenario and the plant related information stored in the domain knowledge repository using the at least one extraction model to obtain the process and equipment knowledge associated with each failure scenario, the one or more hardware processors are configured by the instructions to:

extract one or more equipment instances from the failure knowledge associated with each failure scenario using the at least one extraction model to obtain the at least one equipment associated with each failure scenario, wherein the at least one extraction model is one of: a rule- based model, and a supervised learning model;

identify a plurality of industrial processes relevant to each failure scenario based, at least in part, on the plant related information stored in the domain knowledge repository and the extracted one or more equipment instances;

rank the plurality of industrial processes relevant to each failure scenario based on failure scenario description of the corresponding failure scenario to determine the at least one industrial process associated with each failure scenario;

obtain at least one equipment parameter involved in each failure scenario based on the failure scenario description of the corresponding failure scenario using a predefined parameter keyword dictionary; and identify the at least one sensor that measures the at least one equipment parameter involved in each failure scenario using the plant related information stored in the domain knowledge repository.

11. One or more non-transitory computer readable information storage mediums comprising one or more instructions which when executed by one or more hardware processors cause the one or more hardware processors to perform:

receiving, by a failure knowledge collation and extraction system (FKCES), a plurality of documents associated with an industrial plant, the plurality of documents comprising one or more of: one or more failure mode and effects analysis (FMEA) documents, one or more hazard and operability studies (HAZOP) documents, one or more fault tree analysis (FTA) reports, one or more incident reports, one or more piping and instrumentation diagram (PID) sheets, and one or more structured query language (SQL) views;

pre-processing, by the FKCES, the plurality of documents to obtain a plurality of preprocessed documents;

extracting, by the FKCES, plant related information from the plurality of preprocessed documents stored in a document repository using one or more domain rules and an ontology extraction algorithm to create a domain knowledge repository, wherein the domain knowledge repository comprise information about one or more entities associated with one or more failure scenarios that are present in the plurality of preprocessed documents, one or more relationships that exist among the one or more entities present in the plurality of preprocessed documents, and a process and equipment ontology of the industrial plant, and wherein the process and equipment ontology comprises information about relationship that exist between one or more industrial processes, one or more equipment and one or more sensors that are present in the industrial plant, wherein the ontology extraction algorithm comprises:

converting each PID sheet of the one or more PID sheets into a black and white image;

obtaining at least one text bounding box present in each PID sheet using an optical character recognition (OCR) tool, aligning each text bounding box of the at least one text bounding box present in each PID sheet either horizontally or vertically based on text coordinates present in the corresponding text bounding box;

merging each text bounding box based on text present in corresponding text bounding box using the one or more equipment patterns and the one or more sensor patterns to extract one or more equipment, one or more sensors and coordinates associated with each equipment and sensor that are present in each PID sheet;

for each sensor of the one or more sensors, determining at least one associated equipment from the one or more equipment by applying a proximity threshold to a distance metric in accordance with a process flow line structure to obtain an equipment-sensor relationship, wherein the process flow line structure comprises information associated each process flow line of one or more process flow lines that are present in a PID sheet, and wherein the distance metric is one of a: Euclidean distance and Manhattan distance;

extracting a process name for each PID sheet of the one or more PID sheets based on one or more predefined coordinates using the OCR tool to obtain a process-equipment relationship; and creating the process and equipment ontology of the industrial plant based, at least in part, on the obtained equipment-sensor relationship and the process-equipment relationship;

extracting, by the FKCES, failure knowledge associated with each failure scenario of the one or more failure scenarios from the document repository using one or more failure knowledge extraction models, wherein the failure knowledge associated with each failure scenario comprise one or more of: at least one failure mode that led to a respective failure scenario, at least one cause associated with the respective failure scenario, at least one effect of the respective failure scenario on functioning of the industrial plant, and at least one control action to be taken when the respective failure scenario is active;

identifying, by the FKCES, at least one industrial process, at least one equipment and at least one sensor involved in each failure scenario based, at least in part, on the failure knowledge associated with the respective failure scenario and the plant related information stored in the domain knowledge repository using at least one extraction model to obtain process and equipment knowledge associated with each failure scenario;

determining, by the FKCES, at least one failure detection condition corresponding to each failure scenario based, at least in part, on the plant related information stored in the domain knowledge repository and the obtained process and equipment knowledge using a keyword dictionary; and creating, by the FKCES, a failure scenario knowledge repository using the extracted failure knowledge associated with each failure scenario, the obtained process and equipment knowledge associated with each failure scenario, and the determined at least one failure detection condition corresponding to each failure scenario, the failure scenario knowledge repository comprising failure scenario knowledge associated with each failure scenario that can occur in the industrial plant, the failure scenario knowledge comprising the failure knowledge, the process and equipment knowledge and the at least one failure detection condition.

12. The one or more non-transitory machine-readable information storage mediums of claim 11, wherein the one or more instructions which when executed by the one or more hardware processors further cause:

receiving, by the FKCES, a failure scenario description associated with a failure scenario from a user device;

using, by the FKCES, the failure scenario knowledge repository to obtain failure scenario knowledge associated with the failure scenario; and displaying, by the FKCES, the failure scenario knowledge associated with the failure scenario on the user device.

13. The one or more non-transitory machine-readable information storage mediums of claim 11, wherein the step of extracting, by the FKCES via the one or more hardware processors, the plant related information from the plurality of preprocessed documents present in the document repository using the one or more domain rules and the ontology extraction algorithm to create the domain knowledge repository comprises:

extracting, by the FKCES, the one or more entities associated with the one or more failure scenarios that are present in the one or more FMEA documents, the one or more HAZOP documents, the one or more FTA reports, the one or more incident reports and the one or more SQL reports using naming schema;

extracting, by the FKCES, the one or more relationships that exist among the one or more entities present in the one or more HAZOP documents, the one or more incident reports and the one or more FMEA documents using the one or more domain rules, wherein the one or more relationships comprise one or more of: one or more equipment patterns and one or more sensor patterns; and extracting, by the FKCES, the process and equipment ontology of the industrial plant from the one or more PID sheets based on the one or more equipment patterns and the one or more sensor patterns using the ontology extraction algorithm.

14. The one or more non-transitory machine-readable information storage mediums of claim 11, wherein the step of extracting, by the FKCES, the failure knowledge associated with each failure scenario of the one or more failure scenarios from the domain knowledge repository using the one or more failure knowledge extraction models comprises:

extracting, by the FKCES, the at least one failure mode, the at least one cause, the at least one effect and the at least one control action associated with each failure scenario by performing column mapping in a plurality of headers of spreadsheet columns present in each HAZOP document of the one or more HAZOP documents;

extracting, by the FKCES, information about the one or more industrial processes, the one or more equipment and the one or more sensors present in each paragraph of each incident report using the process and equipment ontology;

extracting, by the FKCES, at least one equipment parameter associated with each equipment using a keyword matching algorithm;

creating, by the FKCES, at least one term frequency-inverse document frequency (tf-idf) vector for each paragraph of each incident report based on text content present in the corresponding paragraph of the corresponding incident report;

performing, by the FKCES, concatenation of the information about the one or more industrial processes, the one or more equipment and the one or more sensors, the at least one equipment parameter associated with each equipment of the one or more equipment, and the at least one tf-idf vector created for each paragraph of each incident report to obtain an input feature vector for performing classification of the corresponding paragraph; and providing, by the FKCES, the input feature vector as an input to the one or more failure knowledge extraction models, wherein the one or more failure knowledge extraction models determine the at least one failure mode, the at least one cause, the at least one effect and the at least one control action associated with each failure scenario from the one or more incident reports, and wherein the one or more failure knowledge extraction models are trained models.

15. The one or more non-transitory machine-readable information storage mediums of claim 11, wherein the step of identifying, by the FKCES, the at least one industrial process, the at least one equipment and the at least one sensor involved in each failure scenario based, at least in part, on the failure knowledge associated with the respective failure scenario and the plant related information stored in the domain knowledge repository using the at least one extraction model to obtain the process and equipment knowledge associated with each failure scenario comprises:

extracting, by the FKCES, one or more equipment instances from the failure knowledge associated with each failure scenario using the at least one extraction model to obtain the at least one equipment associated with each failure scenario, wherein the at least one extraction model is one of: a rule-based model, and a supervised learning model;

identifying, by the FKCES, a plurality of industrial processes relevant to each failure scenario based, at least in part, on the plant related information stored in the domain knowledge repository and the extracted one or more equipment instances;

ranking, by the FKCES, the plurality of industrial processes relevant to each failure scenario based on failure scenario description of the corresponding failure scenario to determine the at least one industrial process associated with each failure scenario;

obtaining, by the FKCES, at least one equipment parameter involved in each failure scenario based on the failure scenario description of the corresponding failure scenario using a predefined parameter keyword dictionary; and identifying, by the FKCES, the at least one sensor that measures the at least one equipment parameter involved in each failure scenario using the plant related information stored in the domain knowledge repository.

* * * * *